United States Patent
Martins

(10) Patent No.: US 10,746,873 B2
(45) Date of Patent: Aug. 18, 2020

(54) MOTION-COMPENSATED ULTRASOUND IMAGES

(75) Inventor: Bo Martins, Herlev (DK)

(73) Assignee: B-K Medical ApS, Herlev (DK)

(*) Notice: Subject to any disclaimer, the term of this patent is extended or adjusted under 35 U.S.C. 154(b) by 775 days.

(21) Appl. No.: 13/812,883

(22) PCT Filed: Jul. 29, 2010

(86) PCT No.: PCT/IB2010/001878
§ 371 (c)(1),
(2), (4) Date: Jan. 29, 2013

(87) PCT Pub. No.: WO2012/013999
PCT Pub. Date: Feb. 2, 2012

(65) Prior Publication Data
US 2013/0128691 A1 May 23, 2013

(51) Int. Cl.
G01S 15/00 (2020.01)
G01S 15/89 (2006.01)

(52) U.S. Cl.
CPC ................... G01S 15/8995 (2013.01)

(58) Field of Classification Search
USPC .............................................................. 367/7
See application file for complete search history.

(56) References Cited

U.S. PATENT DOCUMENTS

| | | | |
|---|---|---|---|
| 5,938,607 A * | 8/1999 | Jago et al. | 600/437 |
| 6,117,081 A * | 9/2000 | Jago et al. | 600/443 |
| 6,126,598 A * | 10/2000 | Entrekin et al. | 600/437 |
| 6,283,917 B1 | 9/2001 | Jago et al. | |
| 6,416,477 B1 * | 7/2002 | Jago | 600/447 |
| 8,150,128 B2 * | 4/2012 | Konofagou | A61B 8/08 382/131 |

(Continued)

FOREIGN PATENT DOCUMENTS

| | | |
|---|---|---|
| JP | 2005-152648 A | 6/2005 |
| WO | WO 0020886 A1 * | 4/2000 |

(Continued)

OTHER PUBLICATIONS

International search report for PCT/IB2010/001878 published as WO 2012/013999 A1.

(Continued)

*Primary Examiner* — James R Hulka
(74) *Attorney, Agent, or Firm* — Anthony M. Del Zoppo, III; Daugherty & Del Zoppo Co., LPA

(57) ABSTRACT

An echo processor (117) for an ultrasound imaging device (102) includes a frame processor (118) that aligns a plurality (N) of sequentially received frames of echoes based on a set of motion displacement fields for the plurality of frames and combines the aligned plurality of sequentially received frames, thereby forming a compounded frame. A method includes obtaining a set of frames of echoes acquired at different times, determining a motion displacement field based on at least two of the frames of the set, motion-compensating all of the frames of the set based on the displacement field and previously determined displacement fields, and generating a compounded frame based on the motion-compensated frames.

22 Claims, 7 Drawing Sheets

(56) References Cited

U.S. PATENT DOCUMENTS

| | | | | |
|---|---|---|---|---|
| 2006/0184020 A1* | 8/2006 | Sumi | ................... | A61B 5/0048 600/437 |
| 2006/0184025 A1* | 8/2006 | Sumi | ................... | A61B 5/0048 600/438 |
| 2008/0064956 A1* | 3/2008 | Jeong | ................... | A61B 8/0858 600/438 |
| 2008/0146931 A1* | 6/2008 | Zhang et al. | ................. | 600/447 |
| 2008/0285819 A1* | 11/2008 | Konofagou | ............. | A61B 8/08 382/128 |

FOREIGN PATENT DOCUMENTS

| | | | |
|---|---|---|---|
| WO | WO 0020887 A1 * | 4/2000 | |
| WO | WO 0216963 A2 * | 2/2002 | |

OTHER PUBLICATIONS

Lin et al., Advantages of Real-Time Spatial Compound Sonography of the Musculoskeletal System Versus Conventional Sonography, Apr. 9, 2002, AJR 2002, pp. 1629-1631 (9 sheets attached) No. 179.

Yoshikawa et al., High Contrast Ultrasound Imaging by Motion-Compensated Time-Averaging Method, 2006, 2006 IEEE Ultrasound Symposium, pp. 1618-1621.

Weinberger, et al., The LOCO-1 Lossless Image Compression Algorithm: Principles and Standardization into JPEG-LS, Hewlett-Packard Laboratories Technical Report No. HPL-98-193RI, Nov. 1998, revised Oct. 1999, pp. 1309-1324 (34 sheets attached), IEEE Trans Image Processing, vol. 9, Aug. 2000.

Japanese Office Action, dated Apr. 8, 2014, JP App. No. 2103-521227.

JP 2002-526227, Ultrasonic Diagnostic Imaging System with Adaptive Spatial Compounding, Aug. 20, 2002.

JP 2002-152648, Video Recording and Reproducing Device, May 24, 2002, Uniden Corp.

JP 2003-070786, Ultrasonic Imaging Unit, Mar. 11, 2003, Hitachi Medical Corp.

JP 2003-310612, Ultrasonic Transmission/Reception Method and Ultrasonic Diagnostic Equipment, Nov. 5, 2003, GE Medical Systems Global Technology Co. LLC.

JP 2006-231069, Imaging System Display Processor, Sep. 7, 2006, Acuson Corp.

JP 2004-507298, Ultrasonic Diagnostic Systems with Spatial Compunded Panoramic Imaging, Mar. 11, 2004.

JP 2011-104381, Ultrasound System and Method for Providing Ultrasound Spatial Compound Image, Jun. 2, 2001, Medison Co. Ltd.

* cited by examiner

MOTION-COMPENSATED ULTRASOUND IMAGES

RELATED APPLICATION

This application is a national filing of PCT application Serial No. PCT/IB2010/001878, filed Jul. 29, 2010, published as WO 2012/013999A1 on Feb. 2, 2012.

TECHNICAL FIELD

The following generally relates to motion-compensated processing and is described with particular application to ultrasound imaging and more particularly to processing series of frames of ultrasound data. However, the following is also amenable to processing frames from other imaging devices.

BACKGROUND

Ultrasound scanners provide useful information about the interior characteristics of an object under examination. In medical applications, clinicians have used ultrasound scanners to examine human subjects in settings such as hospitals, physician's offices, and other locations. Ultrasound scanners have been used in the emergency room, operating room, and similar environments.

Spatial compounding is the process of registering and combing ultrasound frames of the same structure that were acquired at different times and different angles of insonation to form a single compounded or combined frame. The individual frames can be obtained by holding the transducer at a fixed position and transmitting the beam at different angles via electronic beam steering and/or electronically controlled mechanical steering of the array of transducer elements inside the scanhead.

To form a single compounded frame, frames shot with different steering angles are aligned and combined. Alignment can be done based purely on geometric transforms using the transducer array geometry constants as well as the applied steering angles, the sampling frequency, and the speed of sound in the insonated tissue. Sources of incorrect alignment include transducer motion, respiration, incorrect speed of sound, varying speed of sound, and refraction of the beam due to interfaces of varying acoustic impedance making the sound wave alter direction. The latter, in particular, is an issue with spatial compounding because the refracted beam direction is a function of the angle with which the insonated beam hits the interface.

To compensate for motion (transducer motion and/or respiration) registration (rigid and/or elastic) of image features visible in the frames to be aligned has been proposed. The limited success for this approach may be due to the problem of finding out what image to align to. As refraction causes a particular image feature to appear in slightly different spatial locations of the image depending of the steering angle, a strong periodicity is introduced in the series of acquired frames. Even (hypothetical) perfect registration and alignment to the latest image would not produce an acceptable series of compounded images, although every single image in the sequence of compounded images would be crisp and clear. Consequently, compensation for motion by registration has so far only been proven successful in practice for non-compounding applications such as cardiac imaging.

Compounded frames generally have lower speckle and better specular reflector delineation relative to the individual frames making up the compounded frames. Generally, speckle is reduced by the square root of N in a compounded frame with N frames, provided that the frames used to create the compounded frame are substantially independent and are averaged. For specular reflector delineation, spatial compound scanning improves frame quality by improving the acquisition of specular interfaces. The final compounded frame generally has improved contrast resolution and enhanced border visualization.

However, as the insonated tissue may be moving due to respiration, heart beat, etc., and as the transducer is purposely or unpurposely (not held still) moving, the features in the frames being combined may not align very well. In general, it may be difficult to know the exact location of a feature in a frame, which has been inferred from crude assumptions on the speed of sound of the insonated tissue. Unfortunately, miss-registration of the frames (the features in the frames) may introduce artifacts into the resulting compounded frame. Such artifacts may include, but are not limited to, blurring, aliasing, and/or duplication of imaged features.

SUMMARY

Aspects of the application address the above matters, and others.

In one aspect, an echo processor for an ultrasound imaging device includes a frame processor that aligns a plurality (N) of sequentially received frames of echoes based on a set of motion displacement fields for the plurality of frames and combines the aligned plurality of sequentially received frames, thereby forming a compounded frame.

In another aspect, a method includes obtaining a set of frames of echoes acquired at different times, determining a motion displacement field based on at least two of the frames of the set, motion-compensating all of the frames of the set based on the displacement field and previously determined displacement fields, and generating a compounded frame based on the motion-compensated frames.

In another aspect, a ultrasound imaging system includes a transducer array that transmits an ultrasound beam and receives corresponding sets of echoes and an echo processor that combines the sets of echoes based on a motion displacement field indicative of a spatial displacement between a sub-set of the sets of echoes which are acquired during different acquisition intervals and have same angle of insonation.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 1:
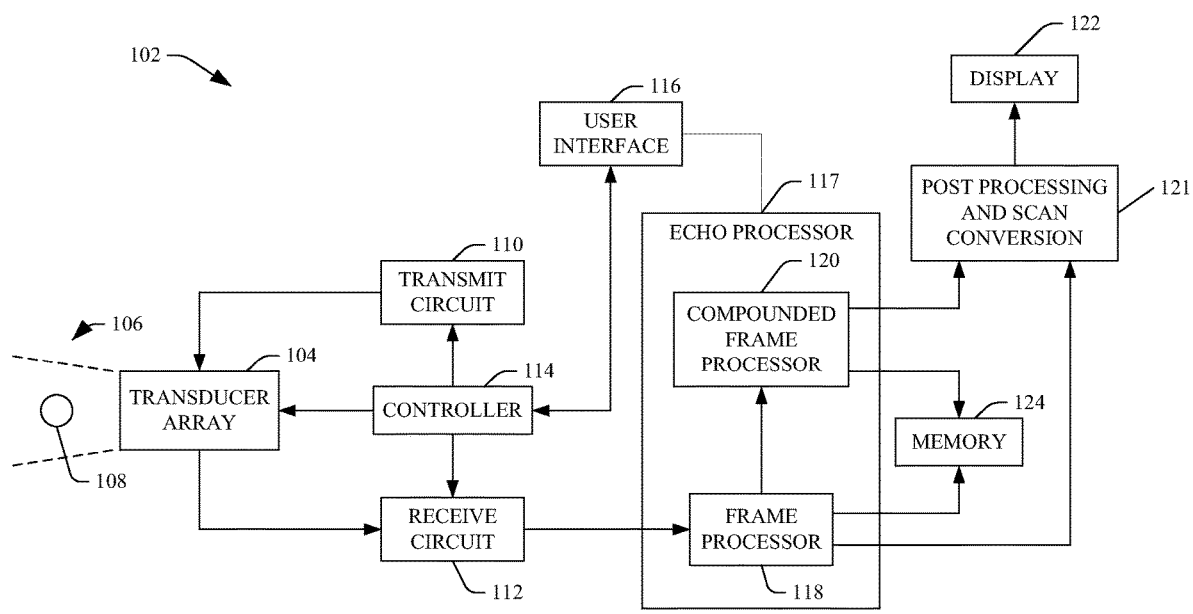
FIG. 1 illustrates an example ultrasound imaging system.

FIG. 1 illustrates an imaging system 102 such as ultrasonic imaging system. The system 102 can be configured for A-mode, B-mode, C-mode, Doppler, and/or other ultrasound acquisitions.

A transducer array 104 includes one or more transducer elements which can be configured as a one dimensional (1D), two dimensional (2D) or other dimensional array of transducer elements. In one embodiment, the array 104 includes 100 to 200 transducer elements. In another embodiment, the transducer array 104 includes more or less transducer elements.

The illustrated transducer array 104 is configured so that it can actuate one or more of the transducer elements in series or parallel. The transducer array 104 also can transmit beams at the same or different angles relative to a face of the transducer array (the scan head) via electronic and/or mechanical steering or focusing. The transmitted beam traverses an examination zone 106 and an object of interest 108 in the examination zone 106. The transducer array 104 receives echoes corresponding to the transmitted beam.

A transmit circuit 110 controls the phasing and/or time of actuation of each of the elements of the transducer array 102, which allows for steering and/or focusing the transmitted beam from predetermined origins along the array and at predetermined angles. A receive circuit 112 receives the echoes received by the transducer array 102 and can be used to focus the received echoes. For example, the receive circuit 112 may be used to delay and sum echoes from the array elements to form data that includes a sequence of focused, coherent echo samples along focused scanlines.

A controller 114 controls the transmit circuit 110 and/or the receive circuit 112. Such control may include, but is not limited to, controlling the number of scanline groups, transmit angles, transmit energies, transmit frequencies, transmit and/or receive delays, etc. A user interface 116 includes various input and/or output devices such as a keyboard, mouse and the like and/or a display screen, audio, etc. for interacting with the controller 114, for example, to selects scan settings, parameters, scan mode, initiate scanning, etc.

An echo processor 117 includes a frame processor 118 that processes frames of echoes (data from each data acquisition interval) and a compounded frame processor 120 that processes compounded frames of echoes. As described in greater detail below, in one instance, the frame processor 118 spatially compounds or combines a set of frames based on a set of motion displacement fields, each of which is determined based on frames from the set which are acquired at different times but the same angle.

It is to be appreciated that combining frames based on the displacement field as such allows for aligning the frames in the set from different angles without accurate knowledge of the properties of the insonated tissue such as the speed of sound in various parts of the tissue and/or the acoustic impedance in various parts of the tissue, and in particular, without the systematic error created by refraction, should the displacement field instead have been sought estimated based on images shot from different angles. Combining the frames as such also allows for aligning the frames without registering features across frames, which may facilitate mitigating miss-registration errors.

Also described in greater detail below, in one instance, the compounded frame processor 120 determines whether compounded frames should be combined, and combines such frames where it is determined that compounded frames should be combined based on the displacement field. In one instance, this includes determining whether combining compounded frames would improve or degrade image quality. In another embodiment, the compounded frame processor 120 is omitted.

The output of 118 or 120 enters a still image processing unit 121 that can be used for filtration, enhancement processing, and the like. If the images entering 121 are not committed to the display coordinate system by the echo processor 117, scan conversion is taking place in 121. Filtration and enhancement may be both before and after scan conversion.

It is to be appreciated that that echo processor 117 can be implemented via one or more micro-processors executing computer readable instructions, embedded or encoded on computer readable storage medium such as memory, which, when executed by the one or more processors cause the processors to perform functions of the echo processor 117 described herein and/or others. In another embodiment, the instructions can additionally or alternatively by embedded or encoded on signal (transitory) medium.

A display 122 can be used to present individual frames, compounded frames, combined compounded frames, and/or other information, for example, in 2D, 3D and/or other formats. Storage such as memory 124 can be used to store the individual frames, compounded frames, combined compounded frames, and/or other information.

Figure 2:
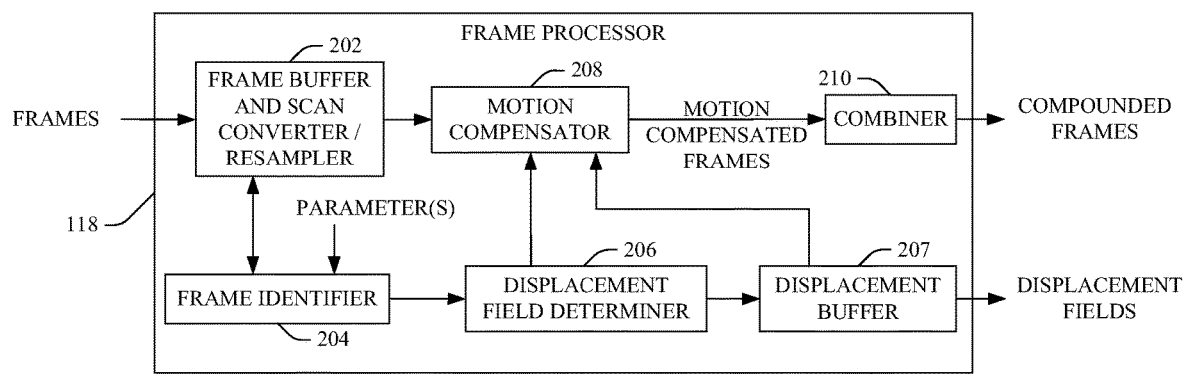
FIG. 2 illustrates an example of transmitting (or receiving) scanlines (or echoes) from different angles with respect to the scanhead of the transducer array.

FIG. 2 illustrates an example embodiment of the frame processor 118.

Figure 3:
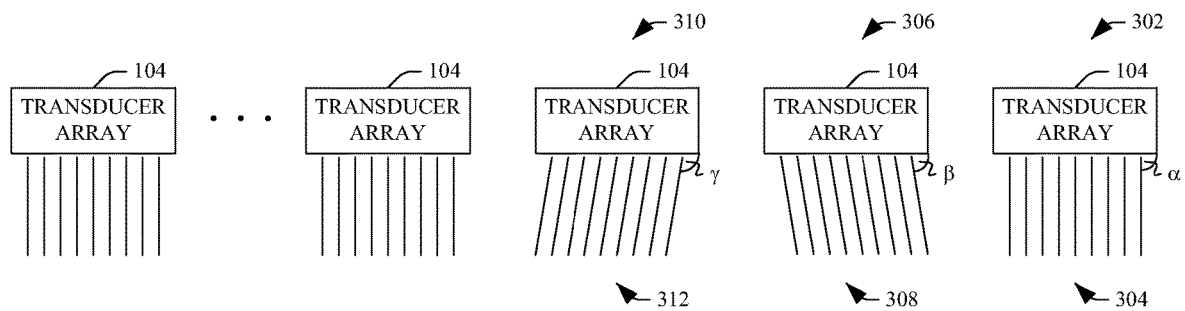
FIG. 3 illustrates an example frame processor.

As described herein, the transducer array 104 can sequentially transmit sets of scanlines at N different angels, with respect to the scanhead, for multiple data acquisition intervals, and receive the corresponding echoes. An example of this is illustrated in FIG. 3, where N=3 for sake of brevity and explanatory purposes. Of course, N can be greater or less than three (3) in other embodiments.

In FIG. 3, for a transmit (or receive) interval 302, the transducer array 104, transmits (or receives) scanlines (echoes) 304 at an angle α with respect to the scanhead of the transducer 104; for a transmit (or receive) interval 306, the transducer array 104, transmits (or receives) scanlines (echoes) 308 at an angle β with respect to the scanhead of the transducer 104, and for a transmit (or receive) interval 310, the transducer array 104, transmits (or receives) scanlines (echoes) 312 at an angle γ with respect to the scanhead of the transducer 104. This pattern is repeated M times, wherein M is an integer greater than or equal to one. In another embodiment, the last angle is β or γ.

With N=3, suitable angles include, but are not limited to, ninety (90) degrees, one hundred (100) degrees, and eighty (80) degrees with respect to the scanhead (or zero (0) degrees, positive ten (+10) degrees, and negative ten (−10) degrees relative to the perpendicular direction from the scanhead).

Returning to FIG. 2, the frame processor 118 includes a frame buffer and scan converter 202 that receives the frames from the receiver circuit 112. In one instance, the frames are sequentially received by the frame buffer and scan converter/resampler 202 in real-time as they are output. In another instance, one or more of the frames are delayed and/or received in series or parallel by the frame buffer and scan converter/resampler 202. Each received frame is time stamped, received along with timing information, and/or otherwise associated with the time (relative or absolute) of the corresponding acquisition.

The frame buffer and scan converter/resampler 202 also resamples the latest frame to a common coordinate system or a common sample grid. In one instance, the common coordinate system may be the display coordinate system. In another instance, the frame buffer and scan converter/resampler 202 resamples the image to produce samples coinciding with the samples of the images acquired at zero (0) degrees relative to the perpendicular direction from the scanhead. In yet another instance, the images acquired at zero (0) degrees relative to the perpendicular direction are axially and/or laterally resampled to produce another common sample grid to which images shot from other angles than 0 are committed by the resampling of 202.

A frame identifier 204 identifies sets of frames from the frame buffer and scan converter 202 for spatially compounding, based on one or more imaging parameters, which may identify a numbers of frames to be combined, the angles of insonation, and/or other information. In the illustrated embodiment, the frame identifier 204 identifies the most recent received frame and the N previous frames. In this example, with N=3, the most recent received frame and the most aged of the N frames are acquired at different moments in time but at the same angle (e.g., $\alpha$).

Figure 4:
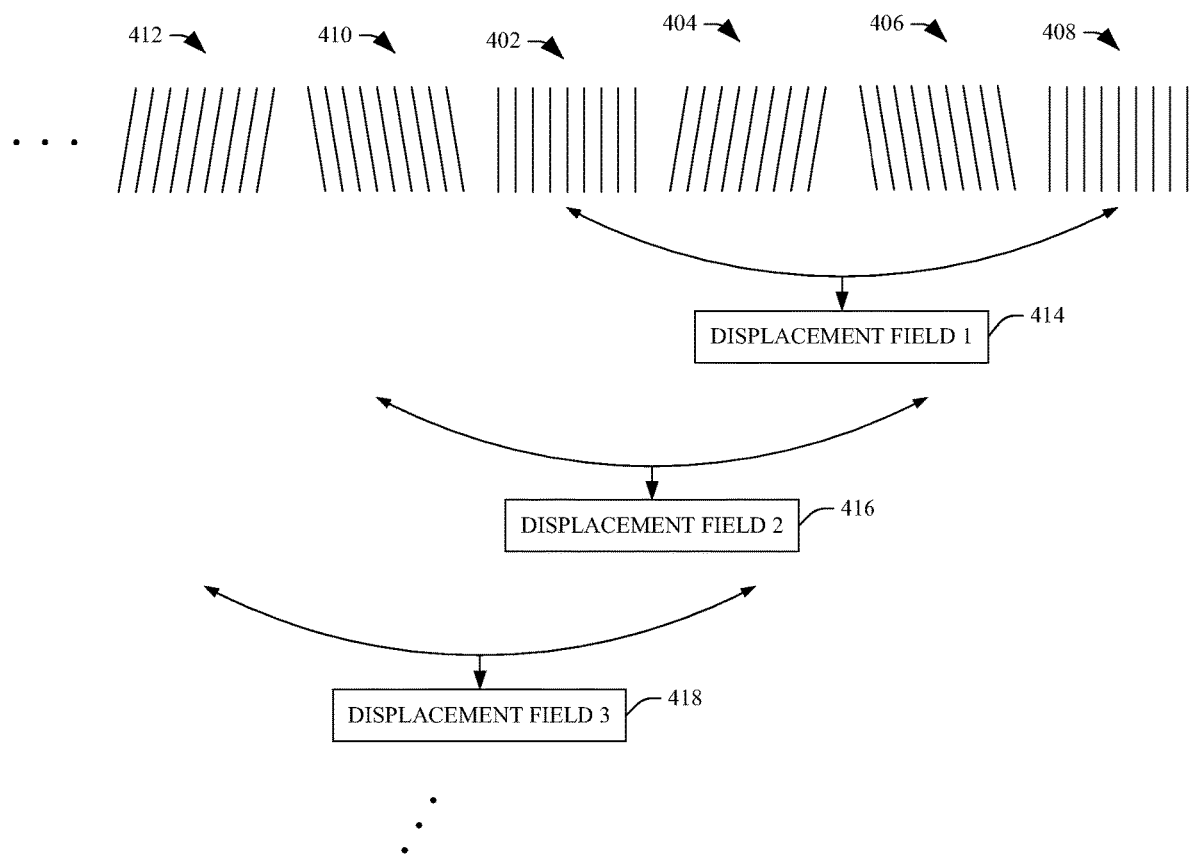
FIG. 4 illustrates an example of determining displacement fields.

FIG. 4 shows an instance in which a frame 402 is the most recent received frame, frames 404, 406 and 408 are the N preceding frames and frame 408 is the previous frame at the same angle of insonation, another instance in which a frame 410 is the most recent received frame, frames 402, 404, and 406 are the N preceding frames and frame 406 is the previous frame at the same angle of insonation, another instance in which a frame 412 is the most recent received frame, frames 410, 402, and 404 are the N preceding frames and frame 404 is the previous frame at the same angle of insonation, . . . .

Returning to FIG. 2, a displacement field determiner 206 determines and generates a displacement field such as a (2D) two-dimensional array of vectors indicative of the displacements between the samples of the reference frame with respect to the most recently received frame. Each displacement in the array represents an average displacement over all or a predetermined sub-set of the samples in the reference frame, and such displacement may be represented into terms of horizontal and vertical pixels or lateral and axial samples or otherwise. Other displacements are also contemplated herein. The displacement field may be based of scanconverted/resampled frames or upon frames that have not been scan-converted/resampled. In the latter case, the displacement field shall be scan-converted to the sample grid of the resampled frames emitted from the frame buffer 202.

The reference frame corresponds to the frame acquired at the same angle as the most recent received framed. By way of example, in FIG. 4, a displacement field 414 is determined based on the most recent received frame 402 and the previous frame 408 acquired at the same angle $\alpha$; a displacement field 416 is determined based on the most recent received frame 410 and the previous frame 406 acquired at the same angle $\beta$; a displacement field 418 is determined based on the most recent received frame 412 and the previous frame 404 acquired at the same angle $\gamma$; . . . .

The displacement field can be variously determined. In one instance, the displacement field determiner 206 computes a plurality of coarsely quantized displacements corresponding to a plurality of predetermined samples shifts (e.g., +5 samples laterally and 0 samples axially, +2 samples axially and +1 samples laterally, −2 samples laterally and 0 samples axially, etc.). Based on how well the reference frame locally matches the most recently received frame for the various investigated displacements, the displacement field determiner 206 can select the best coarse displacement for any entry in the displacement field.

In another instance, the accuracy of the displacement field may be improved by investigating non-integer sample translation (implemented by using interpolation) or by computing fractional displacement based on the matching accuracy of nearby integer displacements. In any instance, the displacement is calculated between the infrequent images shot from the same angle, which eliminates refraction as a source of estimation error. The displacement field determiner 206 determines which displacement field minimizes or optimizes the displacement. This displacement field or another displacement field can be used by the displacement field determiner 206.

Figure 5:
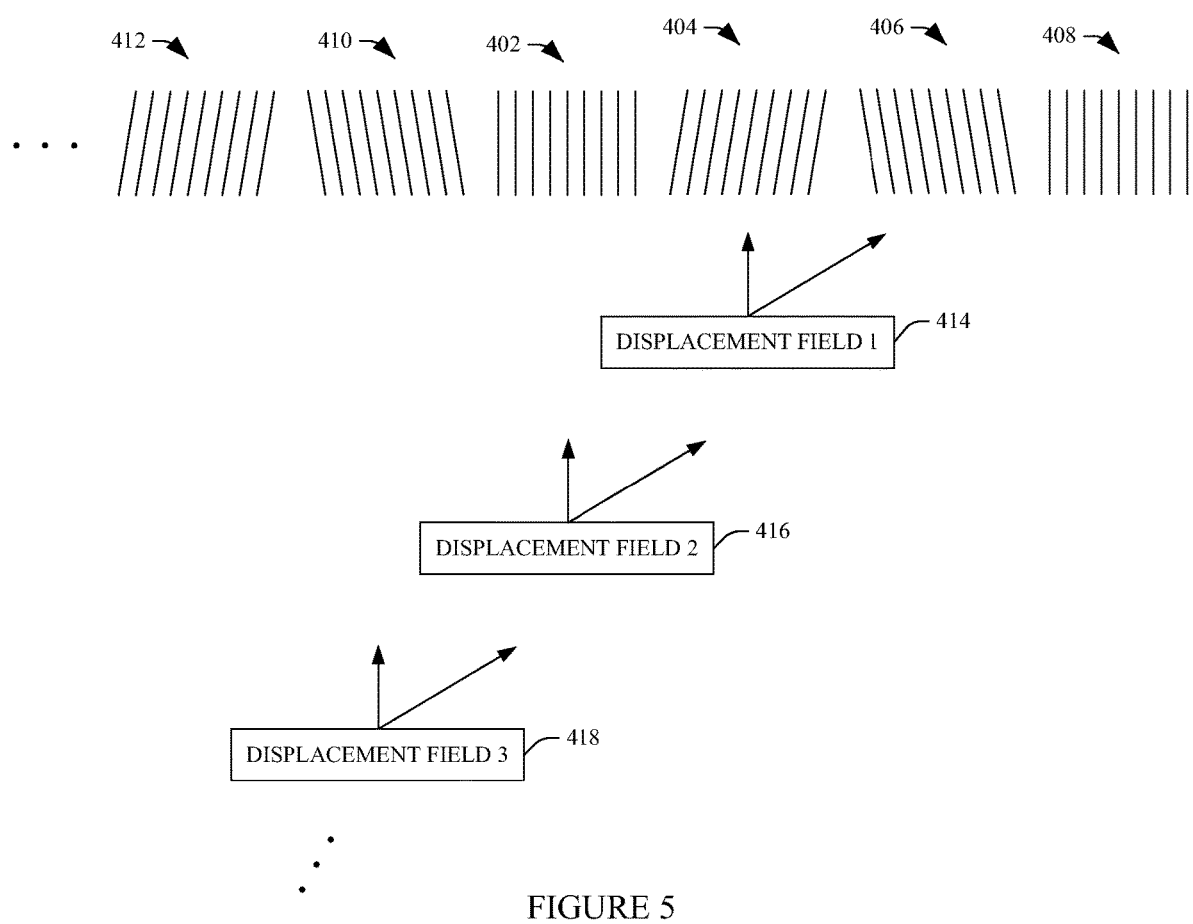
FIG. 5 illustrates an example of using determined displacement fields to align frames.

Returning to FIG. 2, a motion-compensator 208 shifts and/or interpolates samples of the identified frames based on the signal indicative of the displacement. By way of example, and as shown in FIG. 5, frames 404 and 406 are motion-compensated based on the displacement 414 between frames 402 and 408; frames 402 and 404 are motion compensated based on the displacement 416 between frames 410 and 406; frames 410 and 402 are motion-compensated based on the displacement 418 between frames 412 and 404. The motion-compensator 208 utilizes the N−1 latest displacement fields including the latest displacement field. A displacement field buffer 207 stores the N−2 most recent displacement fields. The motion-compensator 208 aligns the frames based on the displacement between the most recent frame and the previous frame acquired at the same angle. By assuming that the motion is constant throughout the frames between two frames at the same angle, the displacement after a single frame interval may be estimated to be 1/N times the estimated displacement.

In the illustrated embodiment, the displacement is spread uniformly or linearly across the frames. By way of example, in a case where displacement field 2 in the supposedly resampled sample grid of 402 is estimated to be three (3) samples laterally for all samples and displacement field 1 in the (resampled) common sample grid of 402 is estimated to be six (6) samples laterally for all samples, alignment of frame 402 and 404 to frame 410 would be done by resampling 410 to the common sample grid of 402, shifting the (previously resampled) frame 402 by one sample horizontally (i.e., (displacement 2)/3), and shifting the (previously resampled) frame 404 by three (3) samples laterally (i.e. (displacement 1+ displacement 2)/3). In other embodiments, the shift may be different for different parts of the frames and/or the shift may include fractional shifts.

Figure 6:
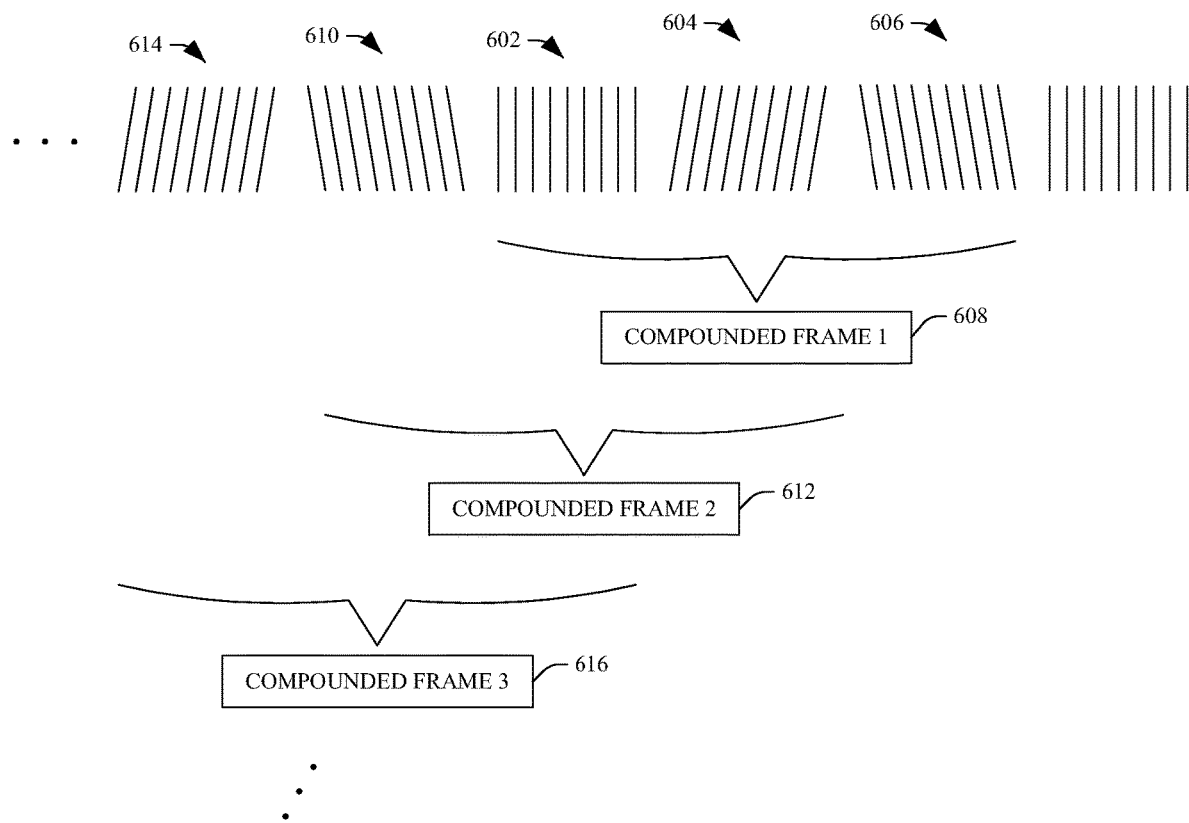
FIG. 6 illustrates an example of combining frames aligned via determined displacement fields.

Returning to FIG. 2, a frame combiner 210 combines or spatially compounds the latest frame with N−1 motion-compensated frames and generates and outputs a compounded frame. By way of example, and as shown in FIG. 6, motion-compensated frames 604 and 606 are combined with frame 602 to form compounded frame 608; motion-compensated frames 602 and 604 are combined with frame 610 to form compounded frame 612; motion-compensated frames 610 and 602 are combined with frame 614 to form compounded frame 616; . . . . In the illustrated embodiment, each frame is weighted equally (1/N) in the regions being covered by all N images. In another embodiment, different combination algorithms are used such as the maximum operation. In another embodiment, different numbers of frames are used to combine samples from different regions (e.g., center, edge, in between) of the frame.

With the above approach, a compounded frame is constructed from the most recent frame and from the N−1 previous frames, all of which have been motion-compensated via a series of displacement fields each of which is estimated solely between two frames shot from the same angle so that refraction is eliminated as a source of motion-estimation error, and frame-to-frame feature registration is not performed.

Figure 7:
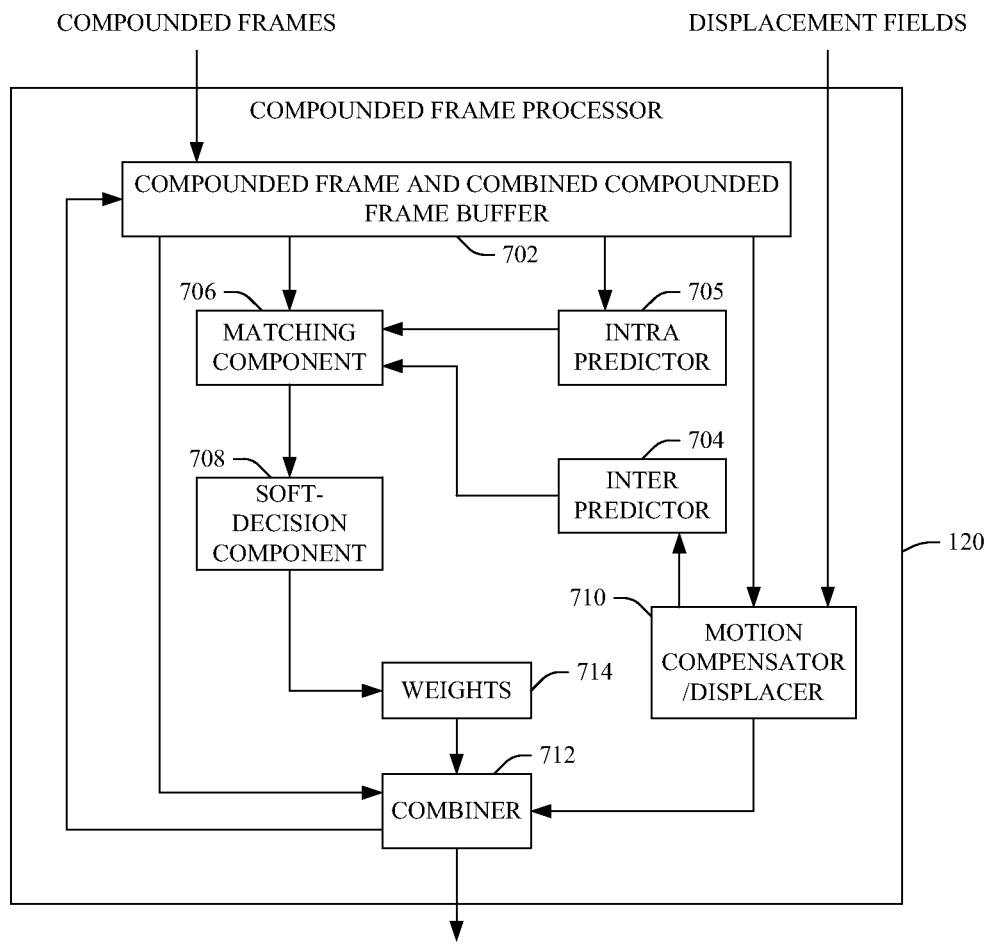
FIG. 7 illustrates an example compounded frame processor.

FIG. 7 illustrates an example of the compounded frame processor 120.

A compounded frame and combined compounded frame buffer 702 receives compounded frames from the frame processor 118 described in connection with FIGS. 2-6 or other frame processor 118, such as where the compounded frames include frames acquired from the same angle.

An inter frame predictor 704 predicts the latest received frame based on the output from a motion compensator/displacer 710 that takes as its inputs the latest estimated displacement field and either the previous received (compounded) frame or the previously generated output from the compounded frame processor.

An intra predictor 705 predicts in a causal manner the latest received frame based on the latest received frame itself. In one instance, the intra predictor 705 is the well-known median edge detector used in the JPEG-LS international standard.

A matching component 706 matches the latest received frame with the predicted frame using the inter predictor 704 and/or using the intra predictor 705, and generates a signal indicative of a similarity between the latest received frame and the inter-predicted frame and/or a similarity of the latest received frame and the intra predicted frame.

A soft-decision component 708 determines whether combining the latest received frame and the inter-predicted frame would likely result in improved image quality (e.g., lower noise) or a degraded image quality (e.g., increase blur or smearing) based the signals indicative of the similarity and generates an output signal indicative thereof.

A combiner 712 combines the next received frame from the buffer 702 and the output from 710 in response to the signal indicating that combining the compounded frames would likely result in improved image quality. The illustrated combiner 712 can variously combine the frames. For example, in one instance the frames are combined based on a common weight 714 for the entire frame. In another embodiment, different weights 714 are employed in different parts of the image depending on the local values of the signals of similarity. In yet another embodiment, the weights 714 are clipped to include at least some predetermined fraction of the latest compounded image.

Where the signal indicates that combining the compounded frames would likely result in degraded image quality, the frames are not combined. As such, the compounded frame processor 120 selectively combines compounded frames, for example, where combining compounded frames would likely improve image quality, and does not combine compounded frames where combining compounded frames would likely degrade image quality. Where compounded frames are combined, the resulting frames may have reduced acoustic and/or electrical noise, reduced speckle, and/or improve delineation of specular reflectors.

It is to be appreciated that the displacement field applied for compounded frames is not estimated based on compounded frames as would be the obvious thing to do. The problem is that neighboring compounded frames are highly dependent, being created from largely the same sample values meaning that subsequent motion estimation is primarily a result of the original compounding process and not on the image content. For instance, if the compounded frame is created without motion compensation, motion estimation based on compounded images is very likely to estimate very close to zero motion as the samples in two neighboring compounded frames are created by averaging N sample values where N−1 of these values are exactly identical in both frames when zero motion is evaluated.

Figure 8:
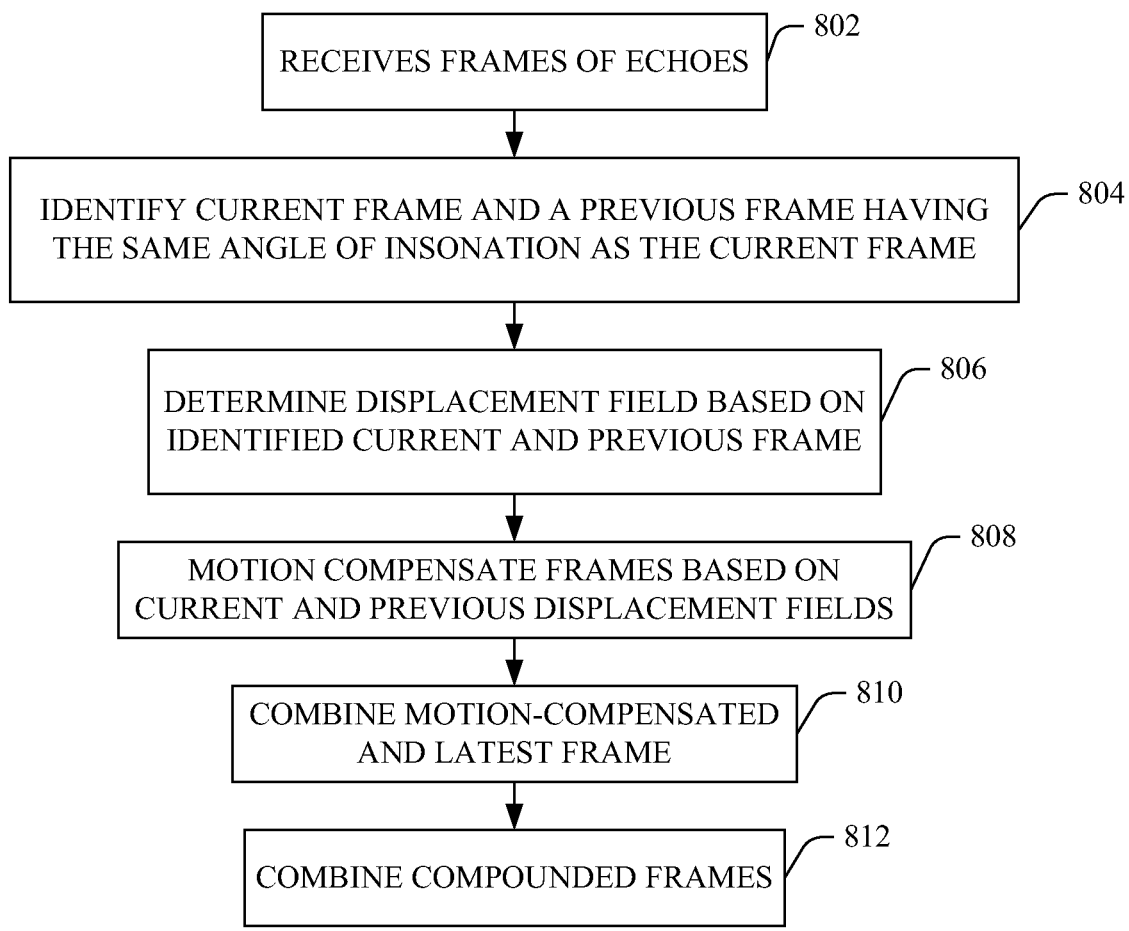
FIG. 8 illustrates an example method for spatially compounding frames.

FIG. 8 illustrates a method for spatially compounding frames.

At 802, frames of echoes for a plurality of acquisition intervals are received.

At 804, for a current frame of the frames, a previous frame of the frames acquired at the same angle of insonation as the current frame is identified.

At 806, a displacement field between the current frame and the identified previous frame is determined.

At 808, the frames between the current frame and the identified previous frame are motion-compensated based on the determined displacement field as well as previously determined displacement fields.

At 810, the motion-compensated frames and the latest frame are combined to form a compounded frame. Acts 804 to 808 are repeated for one or more subsequent frames.

At 812, compounded frames are selectively combined where it is determined that combining compounded frames is likely to increase image quality as described herein.

Figure 9:
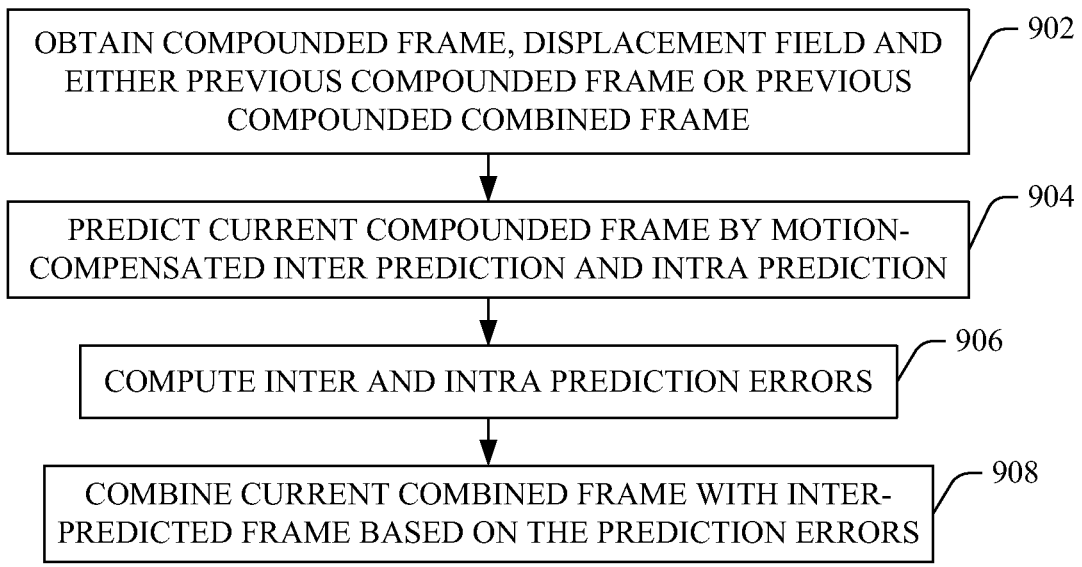
FIG. 9 illustrates an example method for selectively combing compounded frames.

FIG. 9 illustrates a method for selectively combing compounded frames.

At 902, a compounded frame, a displacement field, and either a previous compounded frame or a previous compounded combined output frame are obtained.

At 904, an inter prediction of the frame is created by motion-compensating either the previous compounded frame or the previous combined compounded frame, and an intra predicted frame is computed as a reference.

At 906, the compounded frame is matched with both inter and intra predicted frames.

At 908, where the inter predicted frame has a significantly lower prediction error than the intra predictor, the inter predicted frame is combined with the latest compounded frame. Otherwise, the compounded frames are not combined. As discussed herein, combining compounded frames may facilitate reducing noise and speckle.

Although the above is described in the context of an imaging apparatus such as an ultrasounds imaging apparatus, it is to be understood the other modality imaging apparatuses and non imaging apparatuses that contain an inherent problem of aligning data acquired at different angles or at different phases are also contemplated herein.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An echo processor for an ultrasound imaging device, the echo processor comprising:
a frame processor, including:
a frame buffer and scan converter/sampler configured to sequentially receive one or more sets of frames, each set including a most aged frame of a region of a tissue of interest acquired with a transducer array at a fixed position with a first beam having a first transmission angle, at least one next frame of the region of interest acquired with the transducer array at the fixed position with a second beam having a second transmission angle which is different from the first transmission angle, and a most recent frame of the region of interest acquired with the transducer array at the fixed position with a third beam having the first transmission angle;
a frame identifier configured to identify a set of the one or more sets of frames, including the most aged frame, the at least one next frame, and the most recent frame of the identified set;
a displacement field determiner configured to determine a displacement field between the most aged frame and the most recent frame in terms of sample or pixel shifts;
a motion compensator configured to motion compensate the at least one next frame with at least the determined displacement field to correct for incorrect alignment;
a combiner configured to spatially compound the most recent frame and the motion compensated at least one next frame to produce a compounded frame.

2. The echo processor of claim 1, wherein each displacement field is a two-dimensional array of vectors indicative of the displacements between the samples of the most aged frame and the most recently received frame.

3. The echo processor of claim 1, wherein each displacement field represents an average displacement over all or a predetermined sub-set of the samples in the most aged frame.

4. The echo processor of claim 1, wherein the displacement for each image sample is equal to the displacement field divided by a number of frames in the plurality of frames.

5. The echo processor of claim 1, wherein the displacement field determiner computes a plurality of coarsely quantized displacements corresponding to a plurality of predetermined lateral and axial sample shifts, and a coarsely quantized displacement is selected for entry in the displacement field based on how well the most aged frame locally matches the most recently received frame.

6. The echo processor of claim 5, wherein an accuracy of the displacement field is improved by one of: investigating non-integer sample translation implemented by using interpolation; and computing fraction displacement based on a matching accuracy of nearby integer displacements.

7. The echo processor of claim 1, wherein the displacement field estimates motion between the most recently acquired frame and the most aged frame.

8. The echo processor of claim 1, wherein the displacement field aligns the plurality of frames at an acquisition time of the frame acquired at the latest angle of insonation.

9. The echo processor of claim 1, wherein the frame processor comprises:
a compounded frame processor that compounds the compounded frame with a previous compounded frame based on the displacement field.

10. The echo processor of claim 9, wherein the compounded frame processor receives the compounded frame as a latest received frame, the compounded frame processor comprising:
an inter predictor that predicts an inter predicted frame for the compounded frame based on the displacement field with one of: the previous compounded frame and the previous combined compounded frame;
an intra predictor that predicts an intra predicted frame for the compounded frame based on the compounded frame itself;
a matching component that matches the compounded frame with at least one of: the predicted inter predicted frame and the intra predicted frame, and generates a signal indicative of a similarity between the compounded frame and at least one of the inter predicted frame and the intra predicted frame; and
a soft-decision component that determines whether combining the compounded frame and the inter predicted frame would likely result in improved image quality or degraded image quality based on the signal indicative of the similarity, and generates an output signal indicative thereof.

11. The echo processor of claim 10, wherein the compounded frame and the previous compounded frame are combined when the matching indicates that combining the frames is likely to improve image quality.

12. The echo processor of claim 10, wherein the compounded frame and the previous compounded frame are not combined when the matching indicates that combining the frames is likely to degrade image quality.

13. The echo processor of claim 1, wherein the displacement field is a summation of the displacements between corresponding samples of the most recently acquired frame and the most aged frame.

14. A method of processing ultrasound data, the method comprising:
obtaining sets of frames from a frame buffer, each set sequentially received and includes a most aged frame of a region of a tissue of interest acquired with a transducer array at a fixed position with a first beam having a first transmission angle, at least one next frame of the region of interest acquired with the transducer array at the fixed position with a second beam having a second transmission angle which is different from the first transmission angle, and a most recent frame of the region of interest acquired with the transducer array at the fixed position with a third beam having the first transmission;
identifying, with a processor, a set of the sets of frames, including the most aged frame, the at least one next frame, and the most recent frame of the identified set;
determining a motion displacement field between the most aged frame and the most recent frame in terms of sample or pixel shifts;
motion-compensating the at least one next frame with at least the determined displacement field; and
spatially compounding the most recently frame and the motion compensated at least one next frame to produce a compounded frame.

15. The method of claim 14, wherein the set of frames is motion-compensated by the same displacement field.

16. The method of claim 14, wherein the displacement field is uniformly spread across the at least one next frame.

17. The method of claim 16, wherein the at least one frame includes at least two frames, motion compensating the at least one next frame with the displacement field, and motion compensating the at least one other frame with a different displacement.

18. The method of claim 14, wherein the different displacement field is a summation of the displacement field and a second displacement field.

19. The method of claim 14, further comprising:
motion-compensating a previously received compounded frame based on a motion displacement field for a currently received compounded frame; and
generating a combined compounded frame by combining the currently received compounded frame and the motion-compensated previously received compounded frame or a motion-compensated previously generated combined compounded frame.

20. The method of claim 19, further comprising:
selectively combining compounded frames based on a likelihood of improving image quality by combining the frames.

21. The method of claim 20, wherein compounded frames likely to degrade image quality when combined are not combined.

22. The method of claim 14, wherein the displacement field determiner computes a plurality of coarsely quantized displacements corresponding to a plurality of predetermined lateral and axial sample shifts, and a coarsely quantized displacement is selected for entry in the displacement field based on how well the most aged frame locally matches the most recently received frame.

* * * * *